United States Patent
Janarthanam et al.

(10) Patent No.: US 9,685,645 B2
(45) Date of Patent: Jun. 20, 2017

(54) BATTERY PACK VENTING SYSTEM FOR ELECTRIFIED VEHICLE

(71) Applicant: FORD GLOBAL TECHNOLOGIES, LLC, Dearborn, MI (US)

(72) Inventors: Suriyaprakash Ayyangar Janarthanam, Westland, MI (US); Sai Perumalla, Rochester Hills, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 20 days.

(21) Appl. No.: 14/332,980

(22) Filed: Jul. 16, 2014

(65) Prior Publication Data

US 2016/0020447 A1    Jan. 21, 2016

(51) Int. Cl.
| | |
|---|---|
| *H01M 10/62* | (2014.01) |
| *B60L 11/18* | (2006.01) |
| *H01M 2/12* | (2006.01) |
| *H01M 10/625* | (2014.01) |
| *H01M 10/613* | (2014.01) |
| *H01M 10/6561* | (2014.01) |
| *H01M 10/6567* | (2014.01) |
| *B60K 1/04* | (2006.01) |

(52) U.S. Cl.
CPC ....... *H01M 2/1223* (2013.01); *H01M 2/1252* (2013.01); *H01M 10/613* (2015.04); *H01M 10/625* (2015.04); *B60K 1/04* (2013.01); *H01M 10/6561* (2015.04); *H01M 10/6567* (2015.04); *H01M 2220/20* (2013.01)

(58) Field of Classification Search
CPC .............. H01M 10/625; B60L 11/1877; B60L 11/1879
USPC ................................. 180/65.1, 68.5
See application file for complete search history.

(56) References Cited

U.S. PATENT DOCUMENTS

| | | | |
|---|---|---|---|
| 5,643,691 A * | 7/1997 | Iwatsuki | H01M 2/1211 429/54 |
| 5,856,037 A | 1/1999 | Casale et al. | |
| 6,278,259 B1 * | 8/2001 | Kimoto | H01M 2/1282 320/147 |
| 6,660,426 B2 | 12/2003 | Hampe et al. | |
| 8,349,478 B2 | 1/2013 | Timmons et al. | |
| 2011/0117401 A1* | 5/2011 | Lee et al. | 429/82 |
| 2011/0174556 A1* | 7/2011 | Hermann et al. | 180/65.1 |
| 2011/0311848 A1 | 12/2011 | Garascia et al. | |
| 2012/0003513 A1 | 1/2012 | Fuhr | |
| 2012/0244399 A1 | 9/2012 | Tartaglia | |
| 2013/0071706 A1 | 3/2013 | Lee | |

FOREIGN PATENT DOCUMENTS

DE       102011054775 A1    4/2013

* cited by examiner

*Primary Examiner* — Bryan Evans
(74) *Attorney, Agent, or Firm* — Carlson, Gaskey & Olds

(57) ABSTRACT

A battery pack according to an exemplary aspect of the present disclosure includes, among other things, an enclosure that establishes a vent chamber and tubing in fluid communication with the vent chamber. A check valve is mounted outside of the enclosure and is connected to the tubing. The check valve permits flow of battery vent byproducts in a first direction but blocks the flow of atmospheric air in a second, opposite direction.

25 Claims, 5 Drawing Sheets

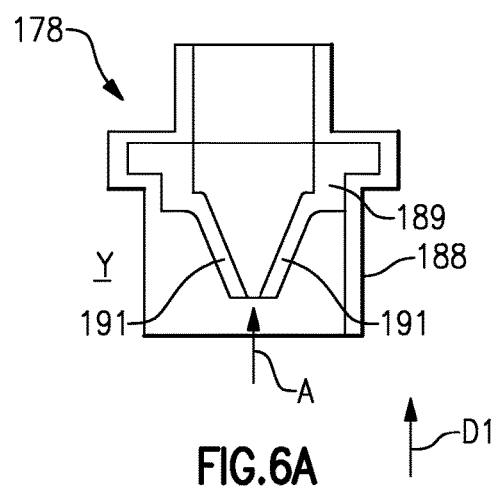
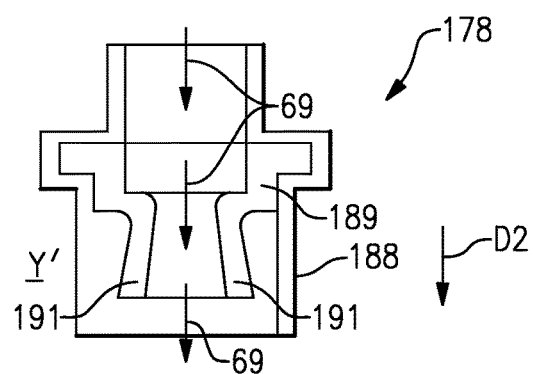
FIG.6A   FIG.6B
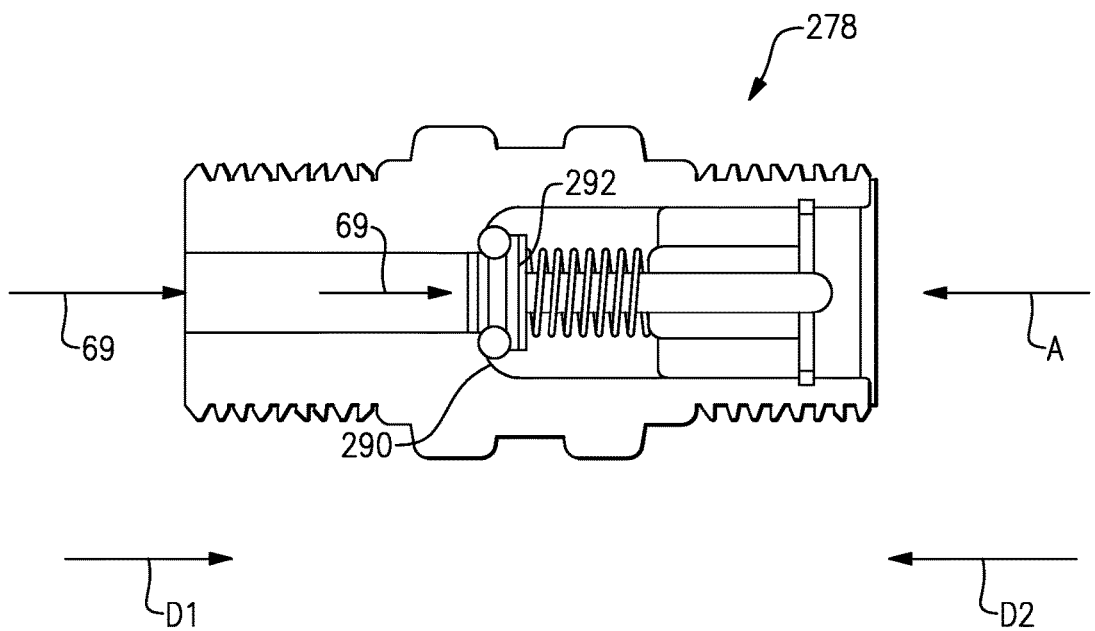
FIG.7

BATTERY PACK VENTING SYSTEM FOR ELECTRIFIED VEHICLE

TECHNICAL FIELD

This disclosure relates to a battery pack of an electrified vehicle. A vent system of the battery pack establishes a flow path for exhausting battery vent byproducts during battery cell venting events.

BACKGROUND

The need to reduce fuel consumption and emissions in automobiles and other vehicles is well known. Therefore, vehicles are being developed that reduce or completely eliminate reliance on an internal combustion engine. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

Electrified vehicle battery packs are typically constructed of one or more battery arrays that include a plurality of battery cells. Battery vent byproducts may be expelled from the battery cells during over-temperature and/or over-current conditions. The battery vent byproducts may need purged from the battery pack when such a venting event occurs.

SUMMARY

A battery pack according to an exemplary aspect of the present disclosure includes, among other things, an enclosure that establishes a vent chamber and tubing in fluid communication with the vent chamber. A check valve is mounted outside of the enclosure and is connected to the tubing. The check valve permits flow of battery vent byproducts in a first direction but blocks the flow of atmospheric air in a second, opposite direction.

In a further non-limiting embodiment of the foregoing battery pack, the check valve is an umbrella valve that includes a sealing disk and a seat, the sealing disk movable between a first position in which the sealing disk covers an opening of the seat and a second position in which the sealing disk is displaced from the opening.

In a further non-limiting embodiment of either of the foregoing battery packs, the check valve is a duckbill valve that includes a seal with movable lips. The lips are movable between a first position in which the lips are closed and a second position in which the lips are spread apart.

In a further non-limiting embodiment of any of the foregoing battery packs, the check valve is an inline check valve that includes a seat and a seal movable between a first position in which the seal is against the seat and a second position in which the seal is moved away from the seat.

In a further non-limiting embodiment of any of the foregoing battery packs, the enclosure establishes a cooling flow path separate from the vent chamber.

In a further non-limiting embodiment of any of the foregoing battery packs, at least one battery array is mounted inside the enclosure.

In a further non-limiting embodiment of any of the foregoing battery packs, the tubing includes multiple branches connected to an end wall of the enclosure, the branches in fluid communication with the vent chamber.

In a further non-limiting embodiment of any of the foregoing battery packs, the check valve is mounted at an interface between the tubing and a vehicle interface structure.

In a further non-limiting embodiment of any of the foregoing battery packs, the vehicle interface structure extends between the enclosure and a vehicle structure.

In a further non-limiting embodiment of any of the foregoing battery packs, the enclosure includes a tray, a cover attached to the tray, and end walls.

An electrified vehicle according to another exemplary aspect of the present disclosure includes, among other things, a vehicle structure, a battery pack mounted to the vehicle structure and a venting system for purging battery vent byproducts from the battery pack. The venting system includes a vent chamber and a check valve.

In a further non-limiting embodiment of the foregoing electrified vehicle, the venting system includes tubing connected between the vent chamber and the check valve.

In a further non-limiting embodiment of either of the foregoing electrified vehicles, a vehicle interface structure is mounted between the battery pack and the vehicle structure, and the check valve is mounted to the vehicle interface structure.

In a further non-limiting embodiment of any of the foregoing electrified vehicles, the battery pack includes an enclosure having a tray. The check valve is mounted to the tray and includes an outlet that is exposed to atmosphere.

In a further non-limiting embodiment of any of the foregoing electrified vehicles, the vehicle structure is a vehicle side member that opens to atmosphere.

In a further non-limiting embodiment of any of the foregoing electrified vehicles, the battery pack includes a cooling flow path that is sealed from the vent chamber.

In a further non-limiting embodiment of any of the foregoing electrified vehicles, the battery pack is liquid cooled.

In a further non-limiting embodiment of any of the foregoing electrified vehicles, the battery pack is air cooled.

In a further non-limiting embodiment of any of the foregoing electrified vehicles, the battery pack includes a plurality of battery arrays that each include a plurality of battery cells, each battery cell having a vent that vents the battery vent byproducts in response to a venting event.

In a further non-limiting embodiment of any of the foregoing electrified vehicles, the check valve permits the battery vent byproducts to flow in a first direction but blocks any reverse flow of atmospheric air in a second, opposite direction.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 6A and 6B illustrate a check valve according to a second embodiment of this disclosure.

FIG. 7 illustrates a check valve according to yet another embodiment of this disclosure.

DETAILED DESCRIPTION

A venting system for expelling battery vent byproducts from a battery pack of an electrified vehicle is detailed in this disclosure. The venting system may include a vent chamber and a check valve. The check valve permits battery vent byproducts to flow in a first direction out of the vent chamber to expel the byproducts, but blocks any reverse flow of atmospheric air in a second, opposite direction into the vent chamber. The check valve may be mounted inside or outside of the battery pack. In some embodiments, tubing extends between the vent chamber and the check valve. These and other features are discussed in greater detail in the paragraphs that follow.

Figure 1:
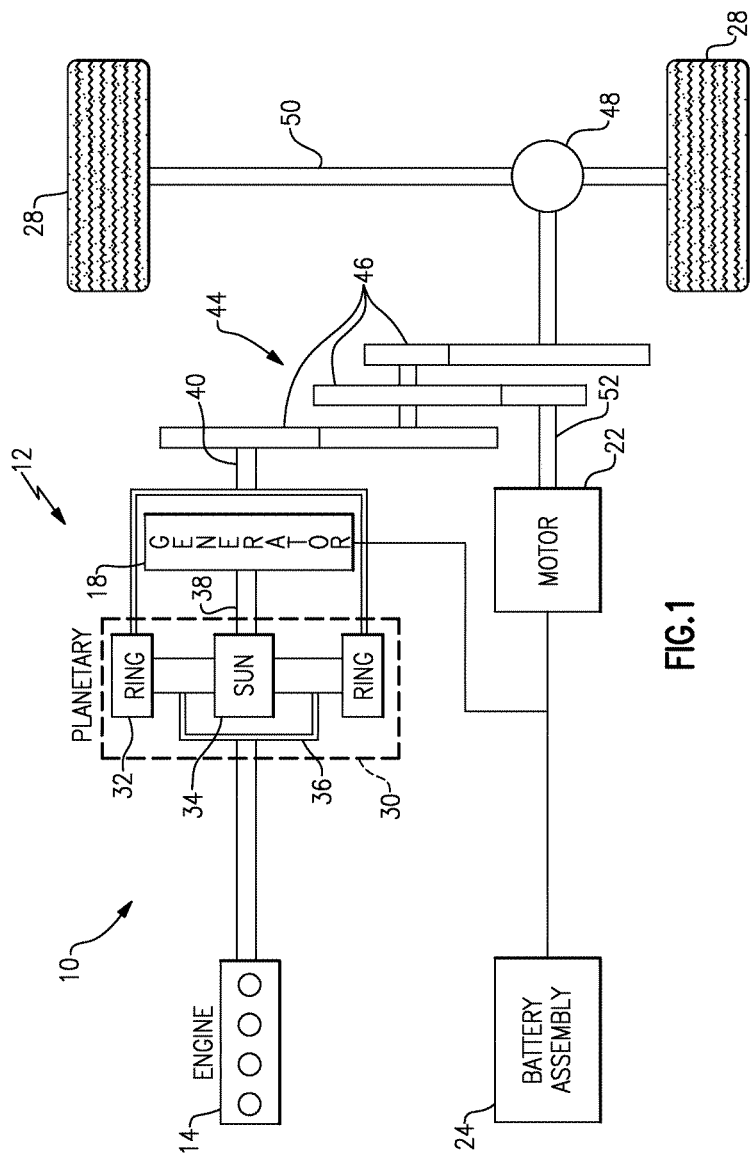
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which could include an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
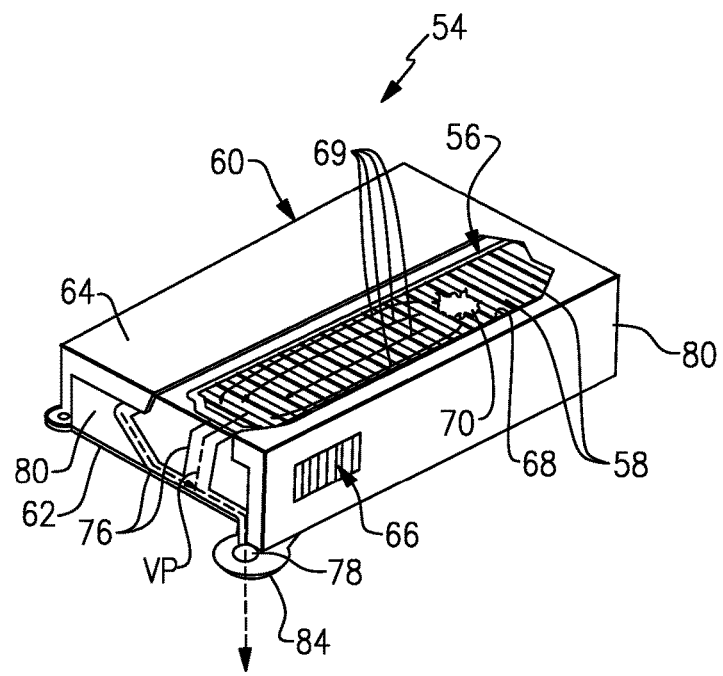
FIG. 2 illustrates a battery pack according to a first embodiment of this disclosure.
Figure 3:
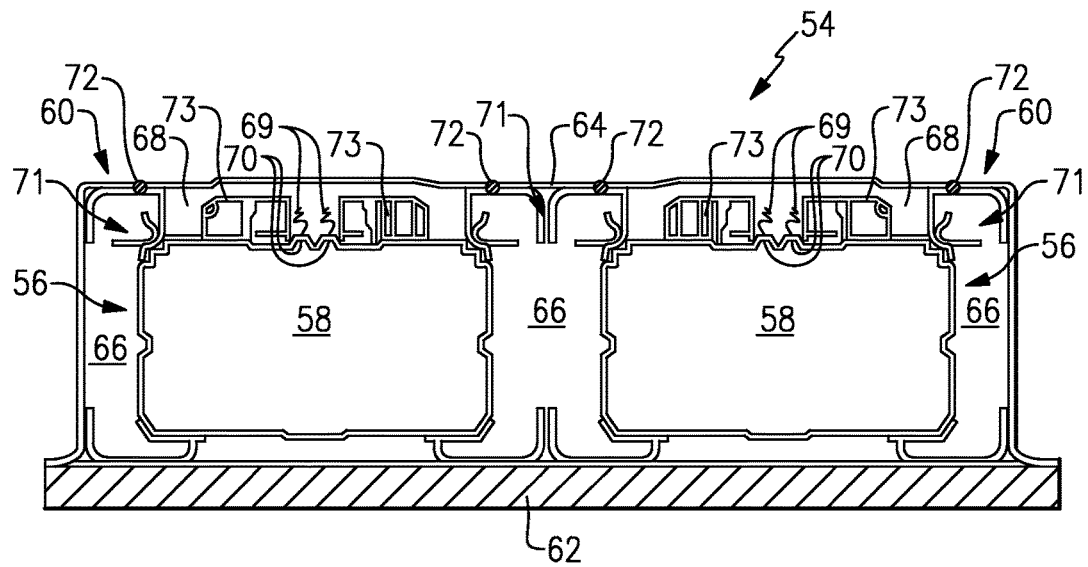
FIG. 3 illustrates a cross-sectional view of the battery pack of FIG. 2.

FIGS. 2 and 3 illustrate a battery pack 54 that can be incorporated into an electrified vehicle. For example, the battery pack 54 could be employed within the battery assembly 24 of the electrified vehicle 12 of FIG. 1. The battery assembly 24 could include one or more battery packs 54 for supplying electrical power to components of the electrified vehicle 12. The number of battery packs 54 employed by the battery assembly 24 is not intended to limit this disclosure and could vary depending on vehicle type, among other factors.

One or more battery arrays 56 are mounted inside the battery pack 54. Although two battery arrays 56 are depicted in this embodiment, the battery pack 54 could house any amount of battery arrays 56 within the scope of this disclosure. Each battery array 56 includes a plurality of battery cells 58. The battery cells 58 may be stacked side-by-side (into the page in FIG. 3) and retained relative to one another to build each battery array 56. The battery cells 58 are prismatic, lithium-ion cells, in one non-limiting embodiment. Other battery cells, including cylindrical and pouch cells, could alternatively be utilized.

The battery pack 54 may additionally include an enclosure 60 that houses the battery arrays 56. In one embodiment, the enclosure 60 includes a tray 62, a cover 64 and end plates 80. The tray 62 is a base of the battery pack 54 and supports the battery arrays 56. The cover 64 may be positioned over and attached to the tray 62 to house the battery arrays 56 of the battery pack 54. The end plates 80 establish opposing ends of the enclosure 60. Together, the tray 62, the cover 64 and the end plates 80 substantially conceal the battery arrays 56 inside the battery pack 54.

Cooling flow paths 66 may extend between the adjacent battery arrays 56 and between the enclosure 60 and the battery arrays 56. A cooling fluid, such as airflow or a liquid coolant, may be communicated through the coolant flow paths 66 to cool the battery cells 58 of the battery arrays 56. In other words, the battery pack 54 may be either air or liquid cooled.

Each battery cell 58 may include one or more vents 70. The vents 70 expel battery vent byproducts 69, such as gases or other byproducts, from the battery cells 58 during certain battery cell venting events. For example, venting events may occur during over-temperature or over-charging conditions of the battery cells 58, or during other conditions.

The battery vent byproducts 69 may vent into vent chambers 68 disposed inside the battery pack 54. A portion of the enclosure 60 is shown removed in FIG. 2 to better illustrate the vent chamber 68 associated with one of the battery arrays 56. In one embodiment, each battery array 56 includes at least one associated vent chamber 68. As best shown in FIG. 3, the vent chambers 68 may be formed by various internal components of the battery pack 54, including but not limited to a frame assembly 71 of each battery array 54, bus bar modules 73, the enclosure 60 (including, in this embodiment, the cover 64), etc.

In one embodiment, such as for an air cooled battery pack, the vent chambers 68 are separated from the cooling flow paths 66. The vent chambers 68 may need separated from cooling flow paths 66 that expel the cooling fluid from the battery pack 54 to a location inside the electrified vehicle. One or more seals 72 may seal the vent chambers 68 from the cooling flow paths 66 to avoid mixing the battery vent byproducts 69 with the cooling fluid communicated through the cooling flow paths 66. The seals 72 may also seal the vent chambers 68 from an exterior of the enclosure 60. The locations of the seals 72 can vary depending on various design considerations.

Figure 4:
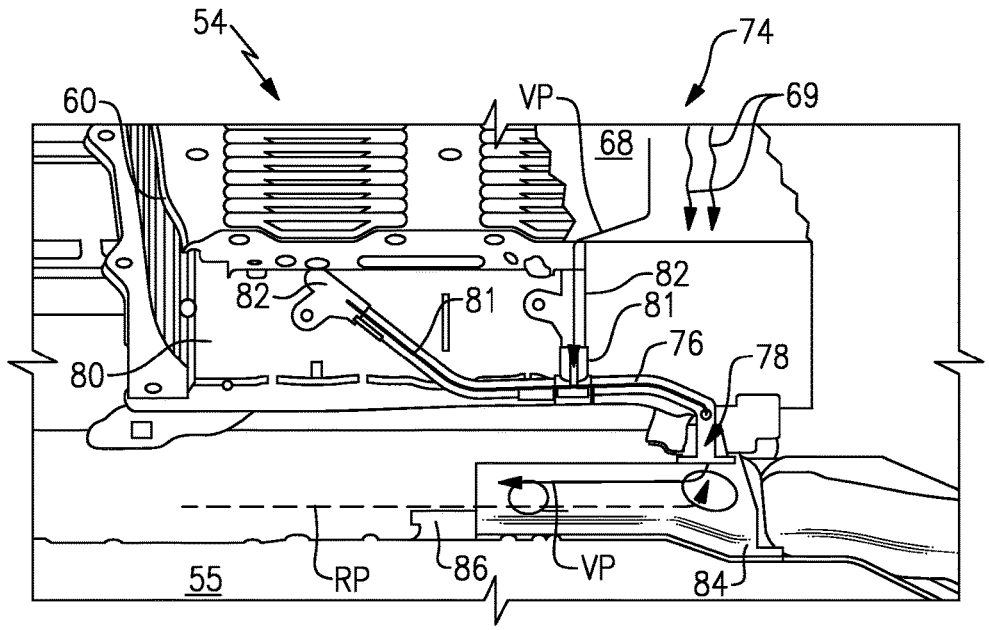
FIG. 4 illustrates a venting system according to an embodiment of this disclosure.

FIG. 4, with continued reference to FIGS. 2 and 3, illustrates an exemplary venting system 74 for expelling the battery vent byproducts 69 from the battery pack 54. In one embodiment, the venting system 74 includes one or more venting chambers 68, tubing 76 and a check valve 78. The venting system 74 establishes a venting path VP (shown in solid lines) for expelling the battery vent byproducts 69 when a battery cell venting event occurs. For example, the battery vent byproducts 69 may flow, under their own motive pressure, through the vent chamber 68, the tubing 76, and the check valve 78 prior to being expelled outside of the battery pack 54, such as to atmosphere 55 (i.e., outside the vehicle).

In one non-limiting embodiment, the tubing 76 attaches to an end plate 80 of the battery pack 54 and fluidly connects to the vent chamber(s) 68. The tubing 76 may include one or more branches 81 for connecting to multiple vent chambers 68. For example, each branch 81 may connect to a different vent chamber 68. Grommets 82 may be positioned at an interface between the branches 81 of the tubing 76 and the end plate 80 to prevent leakage and simplify attachment to the end plate 80.

The check valve 78 may be a one-way valve that permits the battery vent byproducts 69 to flow (along the venting path VP) out of the battery pack 54 to atmosphere 55. The check valve 78 may also block atmospheric air from being communicated along a reverse path RP (shown in dashed lines) from atmosphere 55 into the vent chamber 68. Moisture/humidity of the atmospheric air is undesirable inside the battery pack 54 and is therefore blocked from ingress by the check valve 78.

A vehicle interface structure 84 may extend from a portion of the tray 62 (or, alternatively, enclosure 60) of the battery pack 54. The vehicle interface structure 84 may be part of the tray 62, or could be a separate structure, such as a bracket, that is mounted to the tray 62. The battery pack 54 can be mounted to a vehicle structure 86 using the vehicle interface structure 84. In one embodiment, the vehicle structure 86 is a vehicle side member that has at least one opening to atmosphere 55, or to a location external to the electrified vehicle. Other structures may alternatively be employed as the vehicle structure 86.

In one non-limiting embodiment, the check valve 78 is mounted to the vehicle interface structure 84. The check valve 78 may be positioned at an interface between the tubing 76 and the vehicle interface structure 84. Other serviceable and packageable mounting locations are also contemplated.

The check valve 78 can embody a variety of designs. Non-limiting embodiments of several check valve designs are illustrated in FIGS. 5-7.

Figures 5A, 5B:
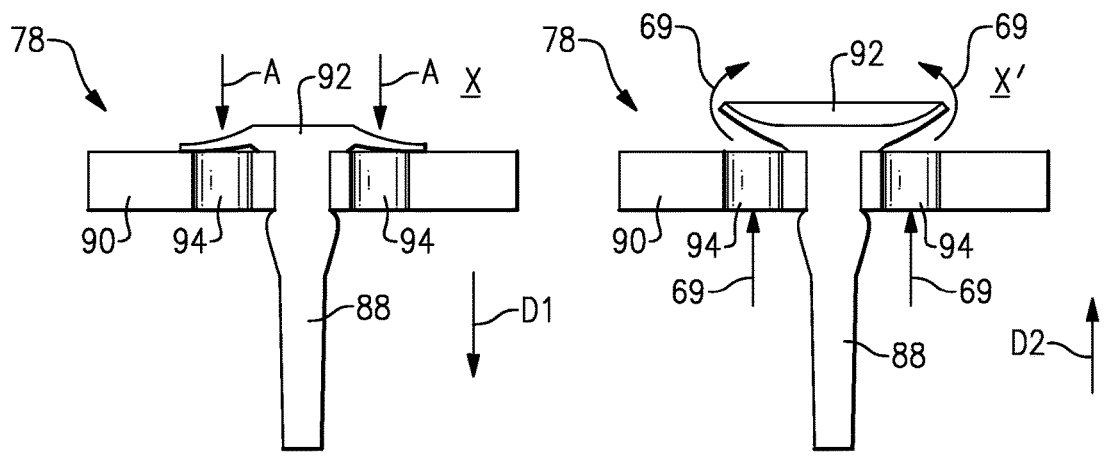
FIGS. 5A and 5B illustrate a check valve according to a first embodiment of this disclosure.

FIGS. 5A and 5B illustrate a check valve 78 according to a first non-limiting embodiment. In this embodiment, the check valve 78 is an umbrella valve that includes a valve body 88 that is mounted in a seat 90. A sealing disk 92 extends from the valve body 88. In a first position X, show in FIG. 5A, the sealing disk 92 lays flat against the seat 90 to cover one or more openings 94 formed through the seat 90. In the first position X, atmospheric air A that is communicated in a first direction D1 is blocked from entering the openings 94. In other words, the check valve 78 blocks the atmospheric air A from entering into the battery pack 54 through the check valve 78.

In the second position X', shown in FIG. 5B, the sealing disk 92 has been lifted away from the seat 90 by the pressure created by the motive flow of the battery vent byproducts 69 in a second direction D2 that is opposite the first direction D1. Flow of the battery vent byproducts 69 lifts the sealing disk 92 away from the seat 90 to uncover the openings 94 and allow the battery vent byproducts 69 to be expelled from the battery pack 54.

FIGS. 6A and 6B illustrate another check valve 178. In this disclosure, like reference numbers designate like elements where appropriate and reference numerals with the addition of 100 or multiples thereof designate modified elements that are understood to incorporate the same features and benefits of the corresponding original elements.

In this embodiment, the check valve 178 is a duckbill valve that includes a valve body 188 and a seal 189 disposed inside the valve body 188. In one embodiment, the seal 189 is an elastomeric seal that includes movable lips 191. The lips 191 are movable between a first position Y (FIG. 6A) and a second position Y' (FIG. 6B). In the first position Y, the lips 191 are closed to block atmospheric air A that is communicated in a first direction D1 from entering into the battery pack 54. In the second position Y', the pressure created by the flow of the battery vent byproducts 69 in a direction D2 that is opposite the first direction D1 spreads the lips 191 apart such that the battery vent byproducts 69 can be expelled to atmosphere.

FIG. 7 illustrates yet another check valve 278. In this embodiment, the check valve 278 is a metallic, inline check valve that includes a seat 290 and seal 292 movable relative to the seat 290. Flow of battery vent byproducts 69 in a first direction D1 moves the seal 292 away from the seat 290 to expel the battery vent byproducts 69, whereas flow of the atmospheric air A in a second, opposite direction D2 is blocked because the seal 292 is firmly seated against the seat 290.

Figure 8:
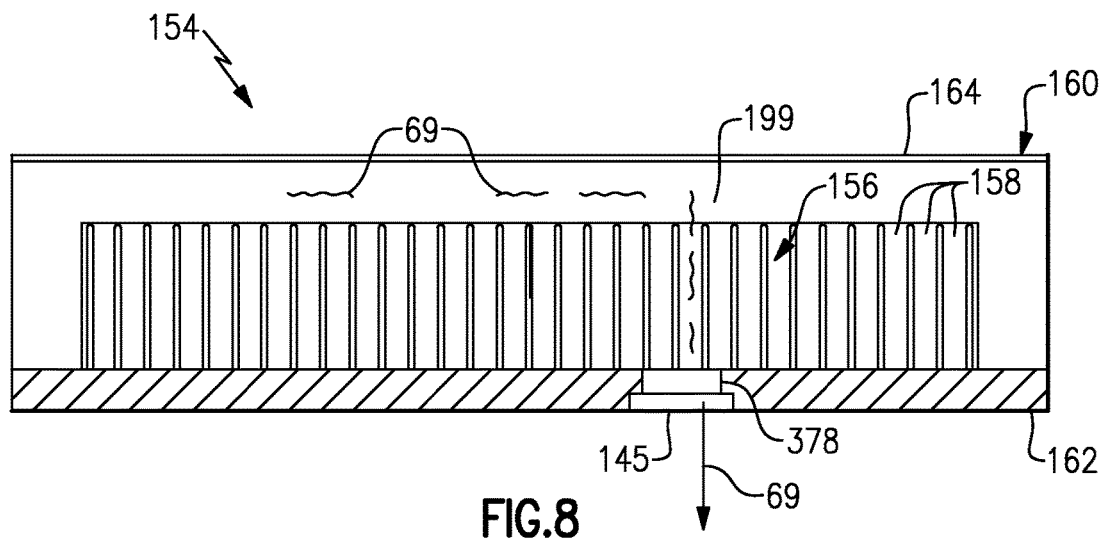
FIG. 8 illustrates a battery pack according to a second embodiment of this disclosure.

FIG. 8 illustrates another exemplary battery pack 154. In this embodiment, the battery pack 154 is a liquid cooled battery pack. Therefore, it includes a single chamber 199 rather than separate venting and cooling chambers such as depicted in FIGS. 2, 3 and 4.

The battery pack 154 may include an enclosure 160 having at least a cover 164 and a tray 162 that surround one or more battery arrays 156. Each battery array 156 includes a plurality of battery cells 158.

A check valve 378 may be mounted inside of the enclosure 160. In one embodiment, the check valve 378 is mounted in the tray 162 for expelling battery vent byproducts 69 from the battery pack 154. Because the check valve 378 is mounted inside the battery pack 154, tubing is not required to expel the battery vent byproducts 69 from the battery pack 154. An outlet 145 of the check valve 378 may be positioned at any location suitable to communicate the battery vent byproducts 69 to atmosphere.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. A battery pack, comprising:
an enclosure that establishes a vent chamber and houses a battery cell having a vent for expelling battery vent byproducts into said vent chamber, and said vent chamber is an open space extending between said battery cell and said enclosure;
tubing in fluid communication with said vent chamber; and
a check valve mounted outside of said enclosure and connected to said tubing, said check valve permitting flow of said battery vent byproducts in a first direction while blocking the flow of atmospheric air in a second, opposite direction.

2. The battery pack as recited in claim 1, wherein said check valve is an umbrella valve that includes a sealing disk and a seat, said sealing disk movable between a first position in which said sealing disk covers an opening of said seat and a second position in which said sealing disk is displaced from said opening.

3. The battery pack as recited in claim 1, wherein said check valve is a duckbill valve that includes a seal with movable lips, wherein said lips are movable between a first position in which said lips are closed and a second position in which said lips are spread apart.

4. The battery pack as recited in claim 1, wherein said check valve is an inline check valve that includes a seat and a seal movable between a first position in which said seal is against said seat and a second position in which said seal is moved away from said seat.

5. The battery pack as recited in claim 1, wherein said enclosure establishes a cooling flow path separate from said vent chamber.

6. The battery pack as recited in claim 1, wherein said tubing includes multiple branches connected to an end wall of said enclosure, said branches in fluid communication with said vent chamber.

7. The battery pack as recited in claim 1, wherein said check valve is mounted at an interface between said tubing and a vehicle interface structure.

8. The battery pack as recited in claim 7, wherein said vehicle interface structure extends between said enclosure and a vehicle structure.

9. The battery pack as recited in claim 1, wherein said enclosure includes a tray, a cover attached to said tray, and end walls.

10. An electrified vehicle, comprising:
a vehicle structure;
a battery pack mounted to said vehicle structure and including a plurality of battery cells each having a vent for venting battery vent byproducts;
a venting system for purging said battery vent byproducts from said battery pack and including a vent chamber and a check valve; and
said check valve mounted within an opening of a vehicle interface structure mounted between said battery pack and said vehicle structure.

11. The electrified vehicle as recited in claim 10, wherein said venting system includes tubing connected between said vent chamber and said check valve.

12. The electrified vehicle as recited in claim 10, wherein said battery pack includes an enclosure having a tray, said check valve mounted to said tray and including an outlet that is exposed to atmosphere.

13. The electrified vehicle as recited in claim 10, wherein said vehicle structure is a vehicle side member that opens to atmosphere.

14. The electrified vehicle as recited in claim 10, wherein said battery pack includes a cooling flow path that is sealed from said vent chamber.

15. The electrified vehicle as recited in claim 10, wherein said battery pack is liquid cooled.

16. The electrified vehicle as recited in claim 10, wherein said battery pack is air cooled.

17. The electrified vehicle as recited in claim 10, wherein said check valve permits said battery vent byproducts to flow in a first direction but blocks any reverse flow of atmospheric air in a second, opposite direction.

18. The battery pack as recited in claim 1, wherein said check valve is located remotely from said vent of said battery cell.

19. The electrified vehicle as recited in claim 10, wherein said vent chamber and said check valve are located externally to said plurality of battery cells.

20. The battery pack as recited in claim 1, wherein said vent chamber is established by said battery cell, a cover of said enclosure, and portions of a frame assembly that holds said battery cell.

21. The battery pack as recited in claim 1, wherein said check valve is mounted within an opening of a vehicle interface structure that extends from said enclosure.

22. The battery pack as recited in claim 1, wherein said tubing attaches to said enclosure without extending into said vent chamber.

23. An electrified vehicle, comprising:
a battery enclosure establishing an open space acting as a vent chamber;
a battery array inside said battery enclosure and including battery cells with vents for expelling battery vent byproducts into said vent chamber;
tubing attached to said enclosure without extending inside said vent chamber; and
a check valve connected to said tubing and located outside said battery enclosure.

24. The electrified vehicle as recited in claim 23, comprising a cooling flow path sealed from said vent chamber.

25. The electrified vehicle as recited in claim 24, wherein said cooling flow path is axially between said battery array and a second battery array.

* * * * *